July 10, 1962     L. F. SWOBODA     3,043,631
VEHICLE WHEEL
Filed May 21, 1959     5 Sheets-Sheet 1
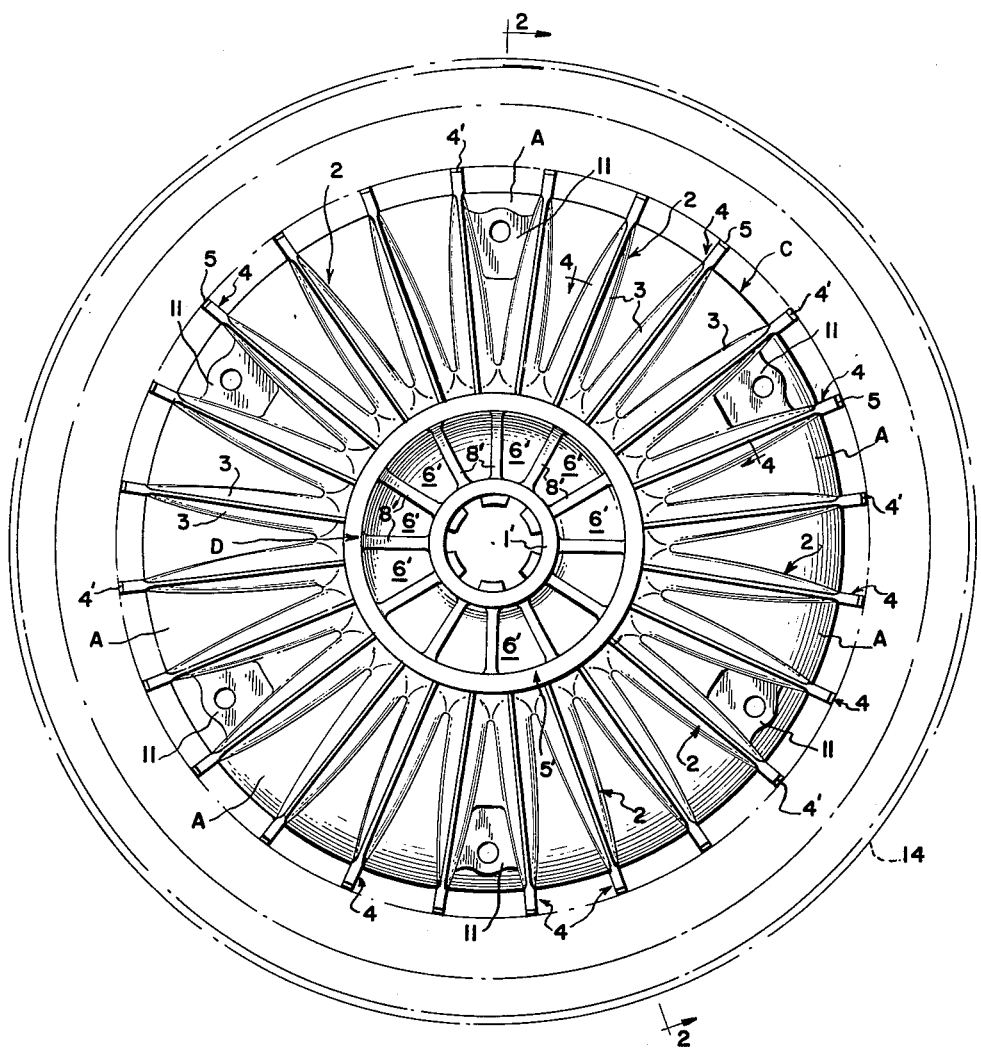
INVENTOR
LEO F. SWOBODA
BY James E. Toomey
ATTORNEY

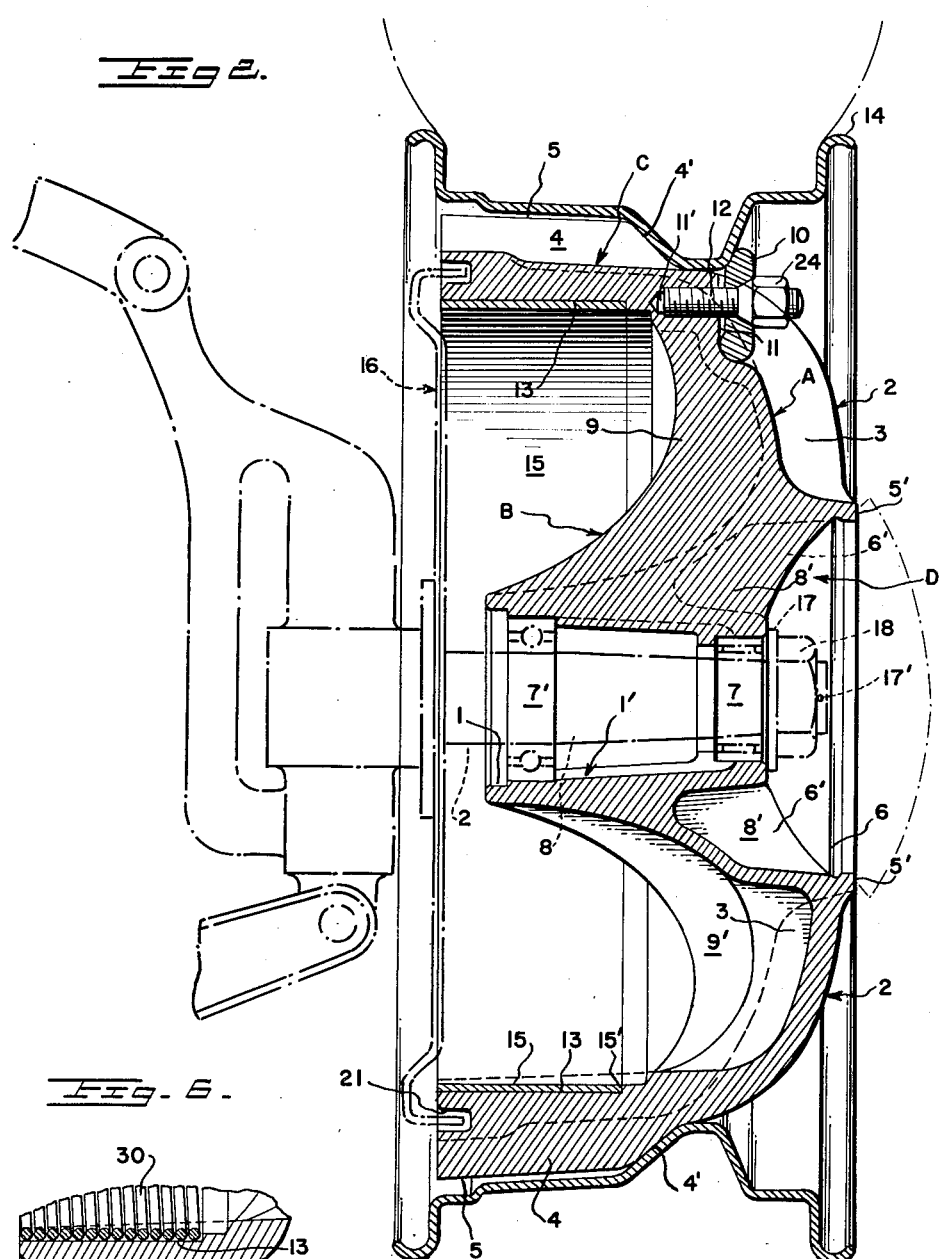

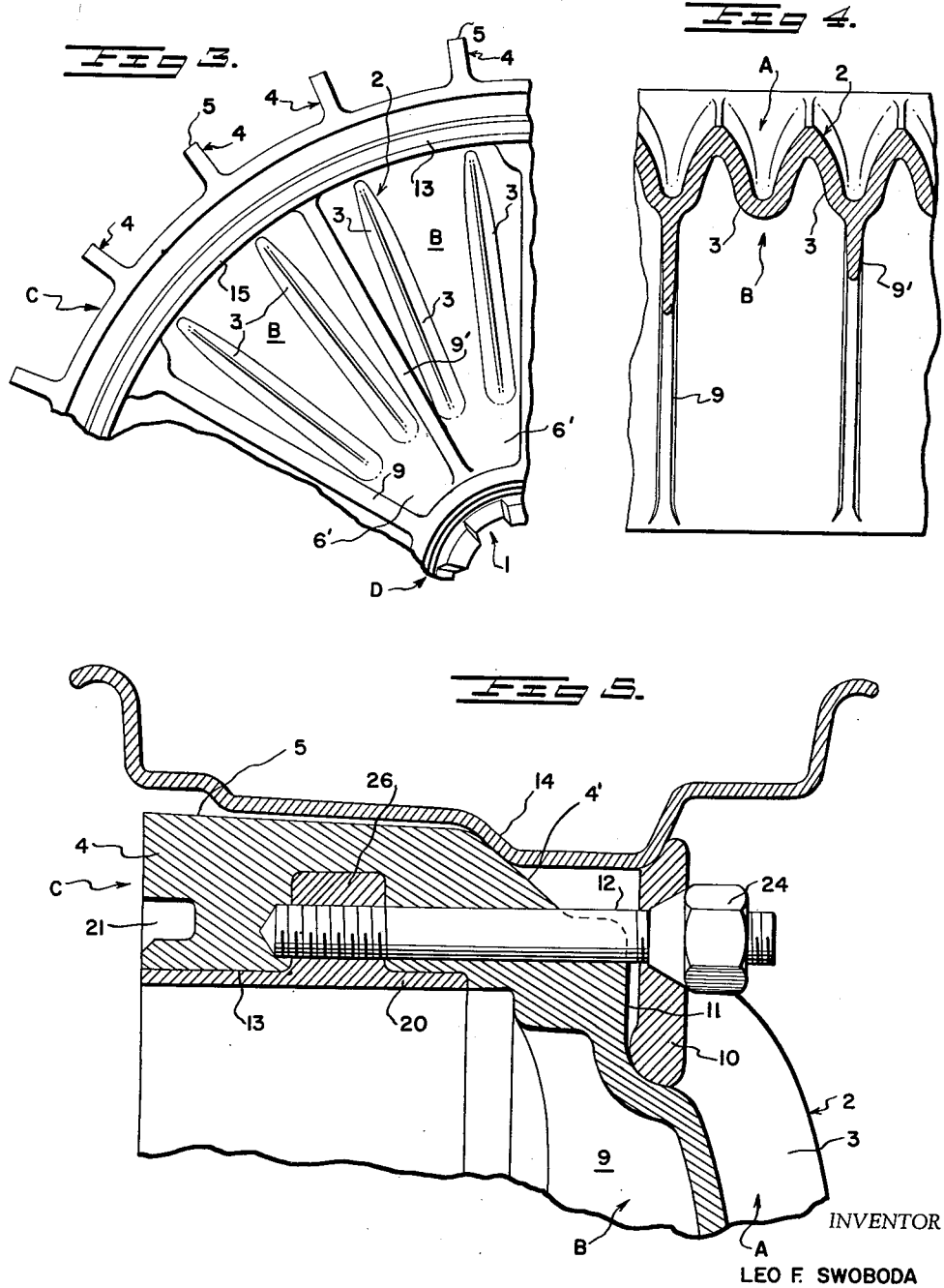

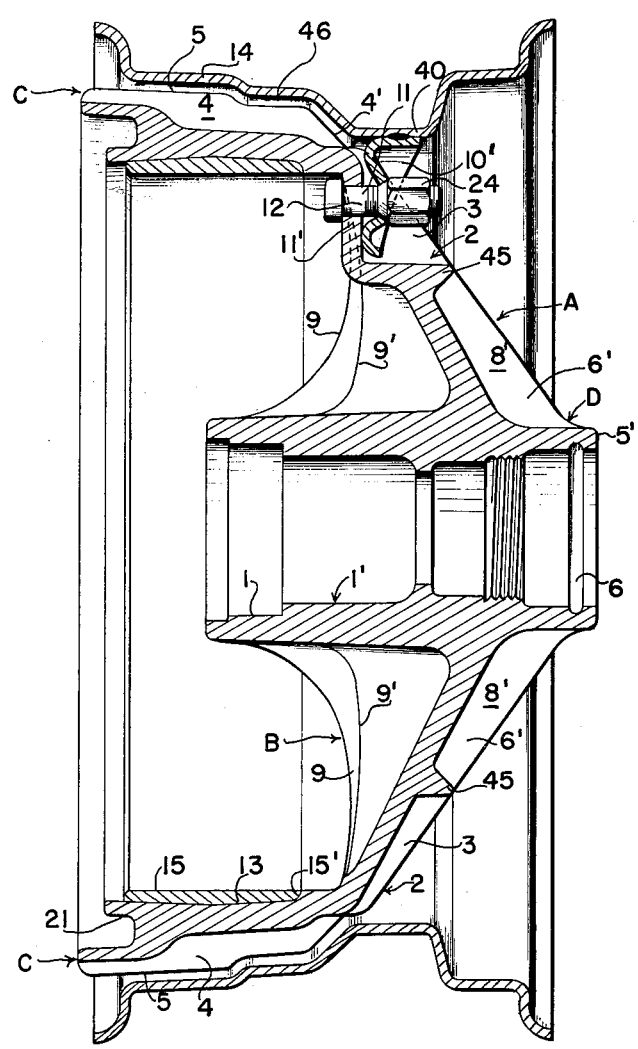

July 10, 1962  L. F. SWOBODA  3,043,631
VEHICLE WHEEL
Filed May 21, 1959  5 Sheets-Sheet 5
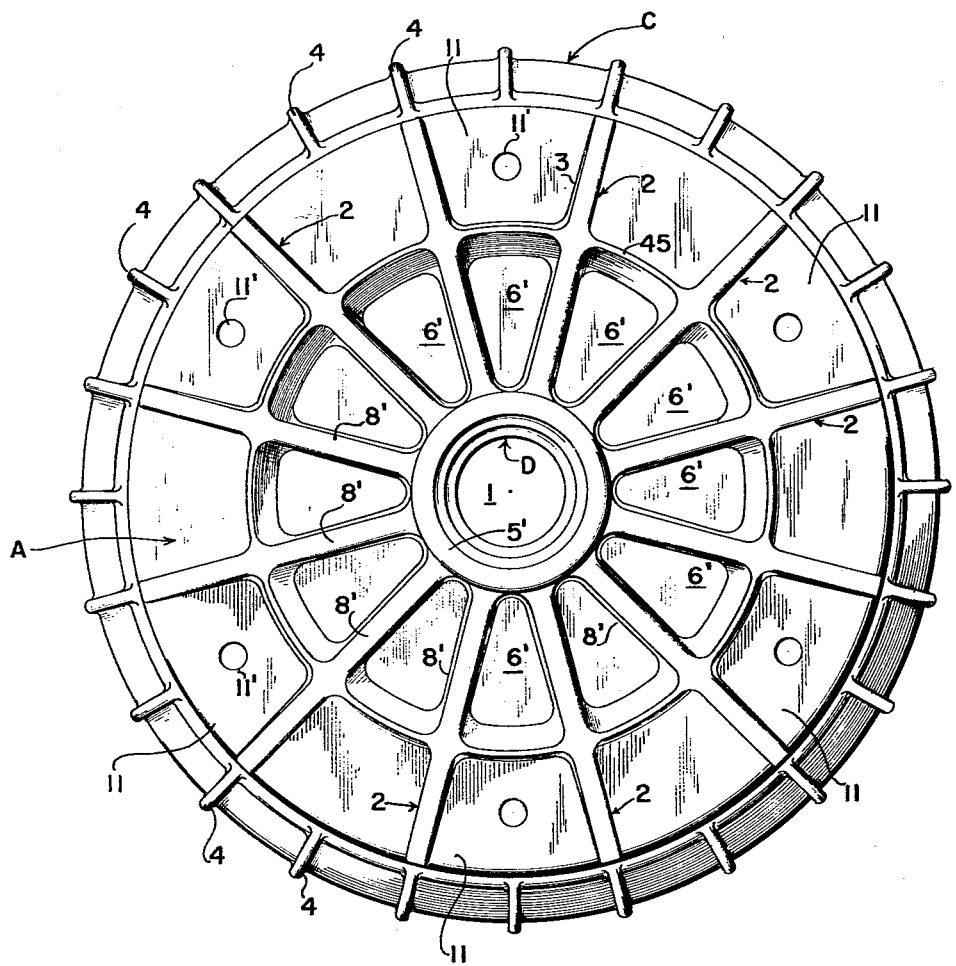
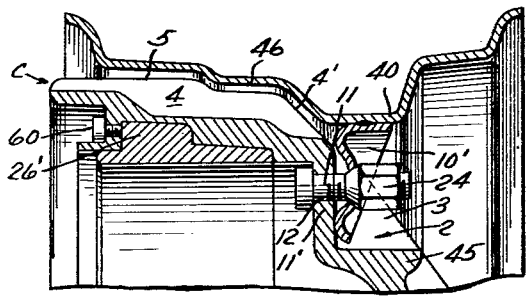
INVENTOR
LEO F. SWOBODA
BY
ATTORNEY United States Patent Office 3,043,631
Patented July 10, 1962

1

3,043,631
VEHICLE WHEEL
Leo F. Swoboda, Northbrook, Ill., assignor to Kaiser Aluminum & Chemical Corporation, Oakland, Calif., a corporation of Delaware
Filed May 21, 1959, Ser. No. 814,703
26 Claims. (Cl. 301—6)

This invention relates to wheel constructions. Specifically, the invention relates to a vehicle wheel such as those used in automobiles and in particular to those which have pneumatic or resilient tires, and cast or forged components of light metal such as aluminum, magnesium, and the like. This application is a continuation-in-part of application Serial No. 575,724, filed April 3, 1956, and now abandoned.

Accordingly, it is a primary purpose of this invention to provide an improved vehicle wheel assembly the major portion of which is fabricated from a casting or forging of a light metal such as aluminum.

The various objects of the invention will become more readily apparent when consideration is given to the following detailed description when taken in conjunction with the appended drawings wherein:

FIGURE 1 is a front elevational view of one preferred embodiment of a wheel construction or assemblage of the demountable rim type incorporating the features of the instant invention with a demountable rim affixed thereto being shown in dotted lines;

FIGURE 2 is a modified side sectional view taken along the line 2—2 of FIGURE 1 showing the wheel of the present invention mounted on a spindle such as for example the front wheel spindle of a conventional suspension system as used today and also having a drop center rim positioned thereon;

FIGURE 3 is a rear elevational view of a portion of the wheel shown in FIGURES 1 and 2;

FIGURE 4 is a sectional view taken along line 4—4 of FIGURE 1 and discloses certain details of the wheel vane and spoke structure in a preferred embodiment of the instant invention;

FIGURE 5 is a partial sectional view of a modification of the vehicle wheel shown in FIGURES 1-4 wherein there is disclosed a further arrangement for attaching a brake drum liner to the drum proper;

FIGURE 6 is a fragmentary sectional view of a portion of the vehicle wheel and discloses a modified type of brake liner therefor;

FIGURE 7 is a side sectional view similar to FIGURE 2 of a modified wheel construction;

FIGURE 8 is a front elevational view of the wheel shown in FIGURE 7 with parts removed; and FIG. 9 is a fragmentary sectional view of the wheel assemblage shown in FIGS. 7 and 8 and discloses one arrangement for fixedly securing a drum liner to the drum proper.

Considering a preferred embodiment of the invention as shown in FIGURE 1, it will be observed that a unitary wheel component incorporating the features of the instant invention would generally comprise a convexo-concave casting or forging, preferably of a light metal such as aluminum, with the convex portion A being located on the outside and the concave portion B being on the inside thereof. As is apparent from an inspection of FIGURE 2, this casting is also generally disposed with its central axis of rotation being located parallel to a horizontal plane. The convexo-concave portions or surfaces A and B terminate adjacent the outer periphery of the wheel component in a generally cylindrical and integrally formed shell portion C. The outer and inner surfaces of this shell portion C are substantially concentric and coaxial with respect to each other.

2

Also formed integrally with the aforesaid portions of the casting is a centrally disposed apertured hub structure D. The central aperture 1 of the hub structure D is provided with a generally cylindrical and stepped coaxial wall 1' for a purpose to be hereinafter described.

Emanating from the outer convex portion A is a series of radially disposed and spaced undulations or vane-like elements 2 roughly V-shaped in cross-section. The individual walls 3 of the vanes or vane-like elements 2 also gradually taper from the inner periphery of the wheel to the outer periphery thereof and merge at their bottom and top extremities smoothly into the convex portion A of the cast wheel. The walls 3 are preferably arcuate rather than planar in cross section as indicated in FIGURE 4. Vanes 2 at their bottom extremities also merge with each other.

It will also be noted that the end extremities of the walls 3 of each of the radially disposed and outwardly projecting vane-like elements 2 located adjacent the outer periphery or the shell portion C of the cast wheel smoothly merge into each other as well as into the shell portion C and with one of a plurality of upstanding and suitably spaced wheel fins or rim supports 4 also formed integrally with the other portions of the casting. In effect, fins 4 advantageously constitute a continuation of each of the tapered vane-like elements 2. Each of the wheel fins 4 is provided with an inclined or tapered upper surface 5 which may be also advantageously stepped if desired. As indicated previously, although wheel fins 4 are formed integrally with other portions of the wheel component, they are unconnected with each other adjacent their terminal ends or surfaces 5 and thus can be said to be unconnected with each other adjacent the outer periphery of the component.

The opposing end of each of the vane-like elements 2 merges smoothly with the central hub structure D which includes an outer circumferential flange 5' concentric with respect to the hub structure D and projecting outwardly from the convex portion A or outer face of the casting.

In the disclosed embodiment, the circumferential flange or lip 5' is shown as including an inner annular groove 6 which is provided to enable snap locking of a suitable hub cap or the like to the casting as shown in phantom in FIGURE 2. However, equally conventional means such as clips, bolts, external projections or grooves will also serve equally well to retain the cap in its proper position on the wheel assembly.

The integrally formed hub structure D, as may be clearly seen from a review of FIGURE 2, is in fact inclusive of the flange or lip 5' and extends inwardly toward the concave face of the casting from which it projects a substantial distance. The hub comprises in effect a rather large mass of centralized material. As may be clearly seen from an inspection of FIGURE 2, the central aperture 1 of the hub structure D is provided with a series of inwardly facing, spaced, cylindrical, coaxial recesses which receive the roller or the like bearings 7 and 7'. Due to the fact that these bearings are usually fabricated of ferrous metal alloys and the coefficients of expansion of the two materials are different, these bearings will be press-fitted into the hub and thus locked in position regardless of any relative expansion and contraction between the casting or forging and the bearing metal.

Alternatively, the bearings may be fit within a suitable liner provided in the cast or forged integral hub into which the bearings may be positioned. This latter arrangement is conventional in the art and hence is not specifically shown in the drawings, though it will be appreciated that such liners may be similar to that used in forming the braking surface but naturally of a smaller diameter so as to fit within the hub structure.

A tapered spindle 8 passes through the bearings and the central aperture as is customary in the art and the wheel and bearings are maintained in place on the spindle 8 by means of a keyed washer 17 which in turn is engaged by a castellated nut 18 held in place by a cotter pin 17' as is also customary in the art.

In order to lighten the hub portion D without a sacrifice in strength and while effecting a savings in excess metal, it will be seen that a series of recesses 6' is advantageously formed in the outer or convex face of the casting intermediate the lip 5' and the central aperture 1. These recesses are defined or bounded by the outwardly projecting ribs 8'. Thus, while the hub is maintained sufficiently strong to withstand the use for which it is intended, a considerable savings in material is effected and at the same time the weight of the entire wheel assembly is reduced. Ribs 8' merge smoothly at their bottom extremities into the wall 1' of the aperture 1 and at their top extremities into the lip 5' of the hub structure. They are also angularly offset with respect to vanes 2.

Referring in particular to FIGURES 1 and 2, it may be seen that the previously mentioned cylindrical portion or shell C which surrounds and is formed integrally with the convexo-concave vaned portions A, B and hub structure D previously described includes the previously mentioned circumferentially spaced and radially projecting series of wheel fins or supports 4. These supports project outwardly from the cylindrical surface and engage a drop center rim 14 at sharply angled surfaces 4' as may be seen in FIGURE 2 in such a manner that air spaces or gaps between the rim and the supports are produced for purposes to be hereinafter described.

Since the number of radially ribbed vanes 2 for the purposes of illustration is twenty-four, there are twenty-four such contact surfaces 4' which engage the rim, though it will be appreciated that a greater or lesser number of vane-like rib elements 2 and surfaces 4' might be provided, without departing from the spirit and scope of the invention.

As shown in FIGURE 2, a rim 14 is maintained in proper position axially or concentrically with respect to the rim supporting casting by means of six lug or dog members 10 which engage the generally vertically disposed lug surfaces 11 provided in the outer convex portion A intermediate certain of the vane elements 2. The lugs 10 engage the smallest diameter of the drop center rim 14, as seen clearly in FIGURE 2, and are positioned on studs 12 which are threadedly engaged in suitable apertures 11' provided in the lug receiving surfaces 11. A nut 24 of the conventional lug type is placed on each stud 12 and as the nut is tightened it will be readily appreciated that the associated lug 10 is forced against and tends to move the rim 14 axially of the wheel. Thus, a locking relation is advantageously effected by the sharply angled, sloping surface 4' only and the properly configured radially outer end surface of the lug 10. The lug receiving surfaces 11 are, as will be appreciated, formed in a common vertical plane and are spaced approximately 60° apart around the circumference of the rim supporting casting between the vane-like elements 2. Thus, although six lug surfaces are provided, it will also be appreciated that more or less lug surfaces can be formed and utilized as desired. The rim 14 is pinched between the lugs or dogs 10 and the surfaces 4' and the rim except for the very small areas of contact between the surfaces 4' and the rim body is spaced from the casting or forging such that the heat conductivity between rim and support is reduced to a minimum. Moreover, the fins 4 cause air turbulence in the clearance between the surfaces 4' and the rim 14 and thus serve to reduce the temperatures attained in the tire and transferred to the rim.

In a further advantageous embodiment of the invention and to provide suitable reinforcement for the rim supporting element or vehicle component and a sufficient amount of material at the lug connection points, a series of radially extending inner spoke members 9 and 9' certain ones of which are arranged in radial alignment with the outside lug receiving surfaces 11 are provided on the inner or concave portion B of the cast wheel. As is clearly evident from an inspection of FIGURE 2, these spokes 9 are relatively deep or thick relative to the axial width of the entire forging or casting and to the spokes 9'. The spokes 9, which are generally in alignment with surfaces 11, have a flared or fillet-like contour from the inner surface of the cylindrical portion to the inner end of the hub such that no sharp angles are formed. Spokes 9' are shallower but similarly contoured. These contours assure the proper distribution of all stresses such that no localized stress conditions will build up with deleterious results. The upper portions of all of these spokes 9, 9' merge smoothly with the shell portion C while their bottom extremities merge smoothly with the hub portion D. Spokes 9' are also spaced 60° apart and are interdigitated between adjacent spokes 9.

Thus, the outward appearance of the wheel is symmetrical on both sides in that the vane-like members 2 are identically spaced about the area of the drum casting on the outer or convex face A while the series of radial spoke elements 9, 9' normally hidden from view on the concave side B serve to reinforce the same against undesired deflection when loads are imposed on the wheel. Vanes 2 are also preferably angularly offset with respect to spoke-like elements 9.

In an advantageous embodiment of the invention, the inner surface 13 of the outer cylindrical portion of shell C of the casting or forging comprises a friction surface against which the lined shoes of a conventional hydraulically, pneumatically or mechanically actuated brake mechanism will be forced during braking of a vehicle to which the wheel assembly of the instant invention may be applied.

While it is contemplated that the aluminum surface itself may constitute or define in and of itself the shoe contacted frictional surface, it may also be advantageous to incorporate a suitable drum liner having long wearing characteristics in the assembly. For this purpose such a liner may comprise a wear resistant metal band 15 fitted, locked or metallurgically bonded within the cylindrical recess 15' formed in the rim supporting casting. The press fit assembly provides for relative expansion and contraction of the dissimilar metals as in the case of the hub D and the bearings 7 and 7'.

Other alternative arrangements are also within the contemplated uses of the instant invention. For example, the friction surface may be formed by properly machining the surface 13 to produce a practically smooth surface. By the use of metal spraying techniques, long wearing characteristics may be imparted to the resultant surface or perhaps the surface when the casting is made of aluminum may be treated by anodizing to increase the resistance thereof to frictional wear. Thus, while shown as a steel band in FIGURE 2, liner 15 may also be sprayed on in the form of a coating and suitably machined and finished. In addition, it is contemplated that a wire 30 as noted in FIGURE 6 wound helically within the cylindrical surface and pressed into proper position with respect thereto, could produce a satisfactory brake drum. Other suitable liners may include aluminum, Monel metal, stainless steel, bronze, etc., and various alloys which have the proper wear resistant qualities.

In FIGURES 1, 2 and 3 the drum liner 15 has been shown as being press fitted within the inner face 13 of the cylindrical portion C of the casting or forging; further techniques are feasible as indicated. However, a further method of fixing a cylindrical liner is shown in FIGURE 5.

In this latter arrangement, the liner 20 is shown as including a series of outwardly extending bosses 26 about which the casting may be formed. In other words, liner 20 is cast "in place." Subsequently, the casting and bosses 26 are drilled axially and the latter tapped such that studs 12 may be threaded into the bosses 26. Thus, the studs 12 serve to both anchor the drum liner in place in the casting as well as to maintain the lugs or dogs 10 in position against the rim 14 through the medium of the lug nut 24.

In any event, no matter which of the above arrangements is ultimately used, intimate contact is assured between the drum defining and rim supporting casting and such material as may comprise the actual braking surface. The inner peripheral edge of the shell portion C of the forging or casting is generally disposed in a vertical plane, as shown in FIGURE 2. This annular surface may be machined to provide an annular recess 21 therein which, as may be seen, receives the outwardly turned edge of the usual brake anchor or backing plate 16 which carries the usual brake actuation mechanism. Thus, a protective seal is formed between the edge of the wheel and the brake anchor plate which to some extent prevents the entry of dust, dirt, moisture or the like into the brake assembly.

Having considered the various components which make up a vehicle wheel incorporating the features of the instant invention, it may now be clearly seen that a great many advantages flow from the described construction and a wheel design is provided wherein light metals such as aluminum may be used to the utmost advantage.

Basically, the cast or forged rim supporting member herein described may be said to comprise a heat exchanger type of vehicle wheel assembly. The effectiveness of such an arrangement is enhanced by the use of light metal, of which aluminum is a prime example, by reason of its rapid heat dissipating qualities which provide for fast removal of any heat generated by braking.

This rapid heat removal is further facilitated by reason of several unique features incorporated in the design of the proposed wheel member or component. These features comprise among other things wheel fins or upstanding rim support elements 4 located in slightly but suitably spaced relation to the brake drum and to themselves. Hence provision is made for the forced circulation of air between the rim and the drum housing. Additionally, aluminum, because of its conductive properties, serves to conduct the heat away from the drum surface. Because of the vane elements 2 on the outside of the wheel and the manner in which they merge with fins 4, the heat will be conducted outwardly where air disturbed by rotation of the vaned surface would rapidly absorb the heat and carry the same away from the brake drum area.

A further unusual and novel result is obtained from the mounting of the rim on the spaced circumferential points on the wheel. Aside from the air passage arrangement provided, the mounting arrangement for the rim element is such that only a small area of contact, as is shown, is presented through which heat may be conducted to the rim. Thus, the rim will be out of contact with the wheel fins for at least the major portion of the length of the wheel fins and the extremely high heats developed during braking will not generally be transferred to the rim and consequently will not cause unusual or undue temperatures and pressures in the pneumatic tire carried on the rim 14. On the other hand, sufficient area is provided between the rim and the wheel so that any heat generated in the rim over a long period of time such as during high speed running will gradually be conducted through these very small points of contact and dissipated in the air by reason of the turbulence produced by the passages between adjacent contact points 4' as well as the passages between rim 14 and the gently sloping surfaces 5 and also by the turbine effect produced by the vanes 2.

FIGURES 7 and 8 disclose a somewhat modified type of vehicle wheel assemblage, the principal modification being the manner in which the rim 14 is anchored to the cast or forged wheel component. Otherwise, except for some minor variations in configuration, the wheel component comprised of convex portion A, concave portion B, shell portion C and hub portion D is of generally the same configuration and structure as that shown in FIGURES 1–6. These minor variations, for example, relate to the disposition of the recesses 6' which instead of being formed intermediate the lip 5' and the central aperture 1 are formed adjacent the outer periphery of the lip 5' and extend to an intermediate portion of the outside or convex portion or surface A where they are bound by an annular integrally formed rib 45. The radially disposed ribs 8' which partially define these recesses 6' also merge smoothly with the annular rib 45 and the walls 3 of the radially extending vane-like elements 2. Moreover, the vane-like elements 2 which in a sense can be considered as extensions of ribs 8' project from the shell portion C to the annular rib 45. These vane-like elements 2 also merge at their outer extremities with or form in effect continuations of alternate wheel fins 4. Finally, the inner spoke members 9 may be aligned either with certain of the outer vane-like members 2 or with the lug receiving surfaces 11 and with spoke members 9' being interdigitated between the spoke members 9.

With further reference to the drawings, it will now be observed that the principal modification as noted above concerns the arrangement for attaching a rim 14 to the wheel component. The lug receiving surfaces 11 provided with apertures 11' are disposed between alternate pairs of vane-like members 2 and every other wheel fin 4. The lugs or dogs 10' bear against these lug receiving surfaces 11 and instead of the rim 14 being pinched against the tapered or inclined surfaces 4' of the wheel fins 4, the rim is welded or otherwise secured directly at the points 40 to the lugs 10' with the lugs 10' then serving as the direct support means for the rim 14 on the wheel component. In other words the rim 14 is not in direct contact with the wheel component and full air spaces or passages 46 will exist between the rim 14 and the wheel component adjacent the tops of fins 4 for the entire length of the fins 4. As indicated in FIG. 9, the drum liner 15 can be advantageously provided with a series of outwardly extending bosses 26 about which the component such as a casting can be formed. In other words, liner 15 can be cast in place. If desired, the component and bosses 26' can be drilled axially and the latter tapped such that bolts 60 may be threaded into the bosses 26' to anchor the liner 15 securely in place.

Although preferred embodiments of the invention have been herein disclosed and described, it will be obvious that various changes may be made therein without departing from the spirit and scope thereof as defined by the following claims wherein what is claimed is:

1. In a vehicle wheel assemblage of the demountable rim type the combination of a light metal unitary rim supporting component comprising integrally formed convex and concave portions, a hub portion and a peripheral cylindrical shell portion, means associated with the inner surface of said shell portion and defining a friction surface adapted to be engaged by a brake mechanism, the outer surface of said shell portion including a plurality of upstanding radially extending peripheral rim contacting members formed integrally therewith, said rim contacting members being unconnected with each other adjacent the outer periphery of the component, said concave portion including radially extending spoke members and said convex portion including a plurality of radially disposed and outwardly projecting vane-like members, a demountable rim bearing against a surface portion of small area on each of said peripheral rim contacting members, said rim contacting members maintaining said rim concentric with respect to and spaced from said component, and means for maintaining said rim on said rim contacting members.

2. In a vehicle wheel assemblage as set forth in claim 1 wherein said means associated with the inner surface of said shell portion and defining a friction surface comprises a wear resistant metal liner.

3. In a vehicle wheel assemblage as set forth in claim 2 wherein said liner is built up by spraying a wear resistant metal coating on the rim supporting component.

4. In a vehicle wheel assemblage as defined in claim 1 wherein the inner extremities of said spoke members and said vane-like members terminate adjacent the center of the said component, and said hub portion is provided with a centrally disposed aperture.

5. A vehicle wheel assemblage of the demountable rim type comprising a cast light metal component provided with a rim supporting brake drum assembly, an integrally formed cylindrical shell portion, a convex portion and a concave portion, said convex and concave portions also being provided with a central apertured hub portion, the inner face of said cylindrical shell portion having means associated therewith defining a frictional braking surface concentric with the centrally disposed aperture in said hub portion, the concave portion further including a plurality of radially extending load supporting spokes, the convex portion including integrally formed and interconnected radial vane-like members, the outer surface of said cylindrical shell portion including integrally formed, outwardly projecting rim contacting elements, portions of which merge with said vane-like members, said rim contacting elements also being unconnected with each other adjacent the outer periphery of the component, a rim removably mounted on the outermost surfaces of said radially disposed rim contacting elements, said surfaces including flattened angularly disposed portions, means including said angularly disposed portions for fixing said rim to said cast component in concentric relation with respect thereto and peripherally spaced therefrom except at said angularly disposed portions, and said vane-like members being so arranged so as to create air turbulence upon rotation of the vehicle wheel assemblage whereby to effect rapid dissipation of heat resulting from braking of the vehicle wheel component.

6. A vehicle wheel assemblage as defined in claim 5 wherein said central aperture is defined by a generally stepped cylindrical wall comprised of and formed by the innermost terminal edges of said radially extending spokes of the concave portion and the vane-like members of said convex portion.

7. A wheel assembly for vehicles of the demountable rim type comprising a light metal unitary integrally formed rim supporting component, said component including a plurality of radially extending and spaced rim contacting elements, convex and concave portions, a hub portion provided with a centrally disposed aperture, a cylindrical shell portion forming the outer periphery of said component, means including said shell portion defining an annular brake drum surface surrounding and concentric with respect to said centrally disposed aperture, each of said rim contacting elements being supported by said shell portion and including an outermost terminal end provided with a surface arranged in angular relation with respect to the normal axis of rotation of said wheel assembly, said component further including vane-like elements disposed on the outer surface of the convex portion with portions of said vane-like elements merging with said rim contacting elements, said rim contacting elements also being unconnected with each other adjacent the outer periphery of the component, a rim removably mounted on the angularly disposed surfaces of said rim contacting elements, circumferentially spaced studs carried by said component, a lug mounted on each of said studs, the lugs engaging said rim and preventing axial displacement of the rim from the said angularly disposed surfaces provided on each of said plurality of rim contacting elements, said rim being spaced from the rim supporting component except at those points where said rim contacting elements engage said rim whereby the area of heat conductive engagement between said component and said rim is reduced to a minimum.

8. A wheel assembly as defined in claim 7 wherein said brake drum defining surface is provided with an annular wear resistant metal band locked into firm interengagement with the said surface.

9. A wheel assembly as defined in claim 7 wherein a liner of wear resistant material is built up on said brake drum defining surface by metal spraying techniques.

10. A wheel assembly as defined in claim 7 wherein said brake drum defining surface is provided with a helically wound wire mounted within and in engagement with the said surface.

11. A wheel assembly as defined in claim 7 wherein said brake drum defining surface is provided with a wear resistant metal linear including a mechanical locking means acting to lock said liner into said assembly.

12. A wheel assembly as defined in claim 7 wherein said brake drum defining surface is provided with a cast in place liner, said liner including radially extending bosses and said studs being in threaded engagement with said bosses.

13. In a vehicle wheel assemblage of the demountable rim type the combination of a unitary rim supporting light metal component comprising integrally formed convex and concave portions, a hub portion and a peripheral cylindrical shell portion, means associated with the inner surface of said shell portion and defining a friction surface adapted to be engaged by a brake mechanism, the outer surface of said shell portion including a plurality of upstanding radially extending wheel fins formed integrally therewith, said wheel fins being unconnected with each other adjacent the outer periphery of the component, said concave portion including radially extending spokes and said convex portion including a plurality of radially disposed and outwardly projecting vane-like members, a rim removably affixed to said rim supporting component and means anchoring said rim to said rim supporting component adjacent the upstanding radially extending wheel fins in such a fashion that the rim will be out of contact with the wheel fins for at least the major portion of the length of the wheel fins.

14. In a vehicle wheel assemblage as defined in claim 13 wherein said last-mentioned means comprises lugs secured to said rim and to said component, the configuration of said lugs and rim being such that the rim will be completely spaced from the wheel fins along the entire length of the wheel fins.

15. In a vehicle wheel assemblage as defined in claim 13 wherein said means associated with the inner surface of said shell portion and defining a friction surface adapted to be engaged by a brake mechanism comprises a wear resistant metal liner.

16. In a vehicle wheel assemblage as defined in claim 13 wherein said means associated with the inner surface of said shell portion and defining a friction surface adapted to be engaged by a brake mechanism comprises a wear resistant metal liner built up by spraying a wear resistant metal coating on the rim supporting component.

17. In a vehicle wheel assemblage of the type set forth in claim 13 wherein the means associated with the inner surface of said shell portion and defining a friction surface adapted to be engaged by a brake mechanism comprises a helically wound wire mounted within and in engagement with said surface.

18. In a vehicle wheel assemblage of the type set forth in claim 13 wherein said means associated with the inner surface of said shell portion and defining a friction surface adapted to be engaged by a brake mechanism comprises an annular wear resistant metal band locked into firm interengagement with the said surface.

19. In a vehicle wheel assemblage as defined in claim 13 wherein the means associated with the inner surface of said shell portion and defining a friction surface adapted to be engaged by a brake mechanism comprises a cast in place liner, said liner including radially extended bosses, and means in threaded engagement with said bosses securing said liner to said component.

20. In a vehicle wheel assemblage of the type set forth in claim 13 wherein said means associated with the inner surface of said shell portion and defining a friction surface adapted to be engaged by a brake mechanism includes a wear resistant metal liner and mechanical locking means acting to lock said liner into said assemblage.

21. In a vehicle wheel assemblage as defined in claim 14 wherein said means associated with the inner surface of said shell portion and defining a friction surface adapted to be engaged by a brake mechanism comprises a wear resistant metal liner.

22. In a vehicle wheel assemblage as defined in claim 14 wherein said means associated with the inner surface of said shell portion and defining a friction surface adapted to be engaged by a brake mechanism comprises a wear resistant metal liner built up by spraying a wear resistant metal coating on the rim supporting component.

23. In a vehicle wheel assemblage of the type set forth in claim 14 wherein the means associated with the inner surface of said shell portion and defining a friction surface adapted to be engaged by a brake mechanism comprises a helically wound wire mounted within and in engagement with said surface.

24. In a vehicle wheel assemblage of the type set forth in claim 14 wherein said means associated with the inner surface of said shell portion and defining a friction surface adapted to be engaged by a brake mechanism comprises an annular wear resistant metal band locked into firm interengagement with the said surface.

25. In a vehicle wheel assemblage as defined in claim 14 wherein the means associated with the inner surface of said shell portion and defining a friction surface adapted to be engaged by a brake mechanism comprises a cast in place liner, said liner including radially extended bosses, and means in threaded engagement with said bosses securing said liner to said component.

26. In a vehicle wheel assemblage of the type set forth in claim 14 wherein said means associated with the inner surface of said shell portion and defining a friction surface adapted to be engaged by a brake mechanism includes a wear resistant metal liner and mechanical locking means acting to lock said liner into said assemblage.

References Cited in the file of this patent

UNITED STATES PATENTS

| | | |
|---|---|---|
| 1,652,653 | Whitcomb | Dec. 13, 1927 |
| 2,051,501 | Sorensen et al. | Aug. 18, 1936 |
| 2,201,445 | Miller et al. | May 21, 1940 |
| 2,308,379 | Mercier | Jan. 12, 1943 |
| 2,382,570 | Kraft | Aug. 14, 1945 |
| 2,740,502 | Butterfield | Apr. 3, 1956 |
| 2,775,323 | English | Dec. 25, 1956 |
| 2,842,377 | Ronning | July 8, 1958 |